J. A. LAMBERT & T. HAWK.
Hanging Loose Pulleys.
No. 149,486. Patented April 7, 1874.
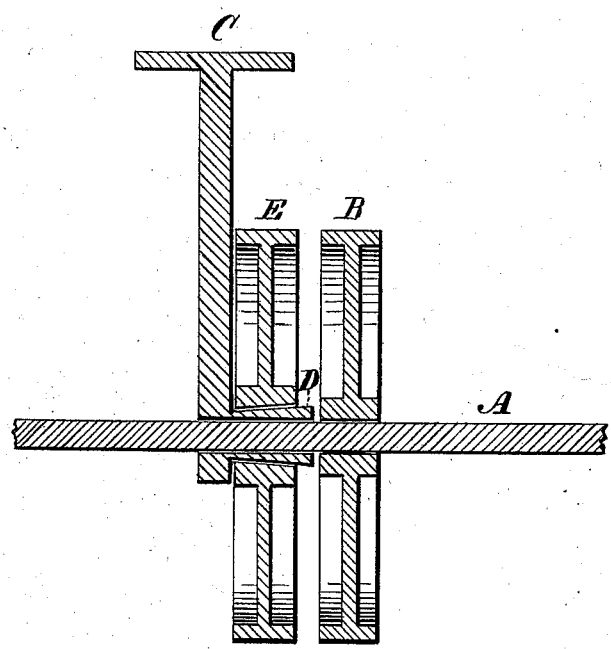

UNITED STATES PATENT OFFICE.

JAMES A. LAMBERT AND THOMAS HAWK, OF NILES, MICHIGAN.

IMPROVEMENT IN HANGING LOOSE PULLEYS.

Specification forming part of Letters Patent No. 149,486, dated April 7, 1874; application filed March 25, 1873.

*To all whom it may concern:*

Be it known that we, JAMES A. LAMBERT and THOMAS HAWK, of the city of Niles, county of Berrien, and State of Michigan, have invented certain Improvements in Hanging Loose Pulleys, of which the following is a specification:

The nature of this invention relates to the construction and hanging of loose pulleys, the object being to avoid friction and reduce the wear of the belt and pulleys.

The accompanying drawing forms a part of this specification, and shows a vertical transverse section through the diameter of a device embodying our invention. The letters of reference marked thereon indicate the parts referred to by a similar letter in the written part of this specification, in which—

A represents an ordinary line-shaft. B represents a tight or driving pulley, which is also a common device. C represents an independent hanger. This hanger is provided with a tapering sleeve, D, through which the line-shaft passes, but with which it has no contact. This sleeve is concentric with the line-shaft, and forms a bearing for the loose pulley E. The eye in the hub of this pulley is fitted to the larger diameter of the tapering sleeve, and as the hub is made somewhat shorter than the bearing on said sleeve, the loose pulley will have some end-play, and will be inclined to work to the smaller part of the bearing on the sleeve, which will slacken the belt and relieve it from a damaging strain, to which such belts are exposed in the usual manner of arranging loose pulleys.

Now, it will be seen, that when the belt is on the loose pulley, it will remain at rest and allow the line-shaft to revolve unencumbered by the loose pulley; and it will be seen that when the common shifting-lever is applied to throw the belt onto the tight pulley B, the loose pulley E being suspended by the hanger C in close proximity to the driving-pulley B, said loose pulley will slide on its bearing until it impinges against the tight or driving pulley, causing said loose pulley to revolve with it, when the belt will instantly pass onto the tight pulley; thus motion may be imparted to a counter-shaft or any driving-pulley.

We prefer using a loose pulley on the counter-shaft with the driving-pulley, in the usual manner; but this is not absolutely necessary, as a long or broad-faced driving-pulley may be used, which will give the belt sufficient lateral play in shifting from the tight to the loose pulley.

Having thus fully described our invention, what we claim is—

The above-described device, consisting of the line-shaft A, tight pulley B, hanger C, tapering sleeve D, loose pulley E, and shifting-lever, all combined substantially as and for the purposes hereinafter set forth.

JAMES A. LAMBERT.
Witnesses:    THOMAS HAWK.
    CLEMENT L. BARRON,
    JAMES L. GLEN.